April 17, 1962  J. A. CLEMENTS ET AL  3,029,884
AUTOMATIC PARALLEL PARKING DEVICE
Filed Feb. 27, 1956  4 Sheets-Sheet 1
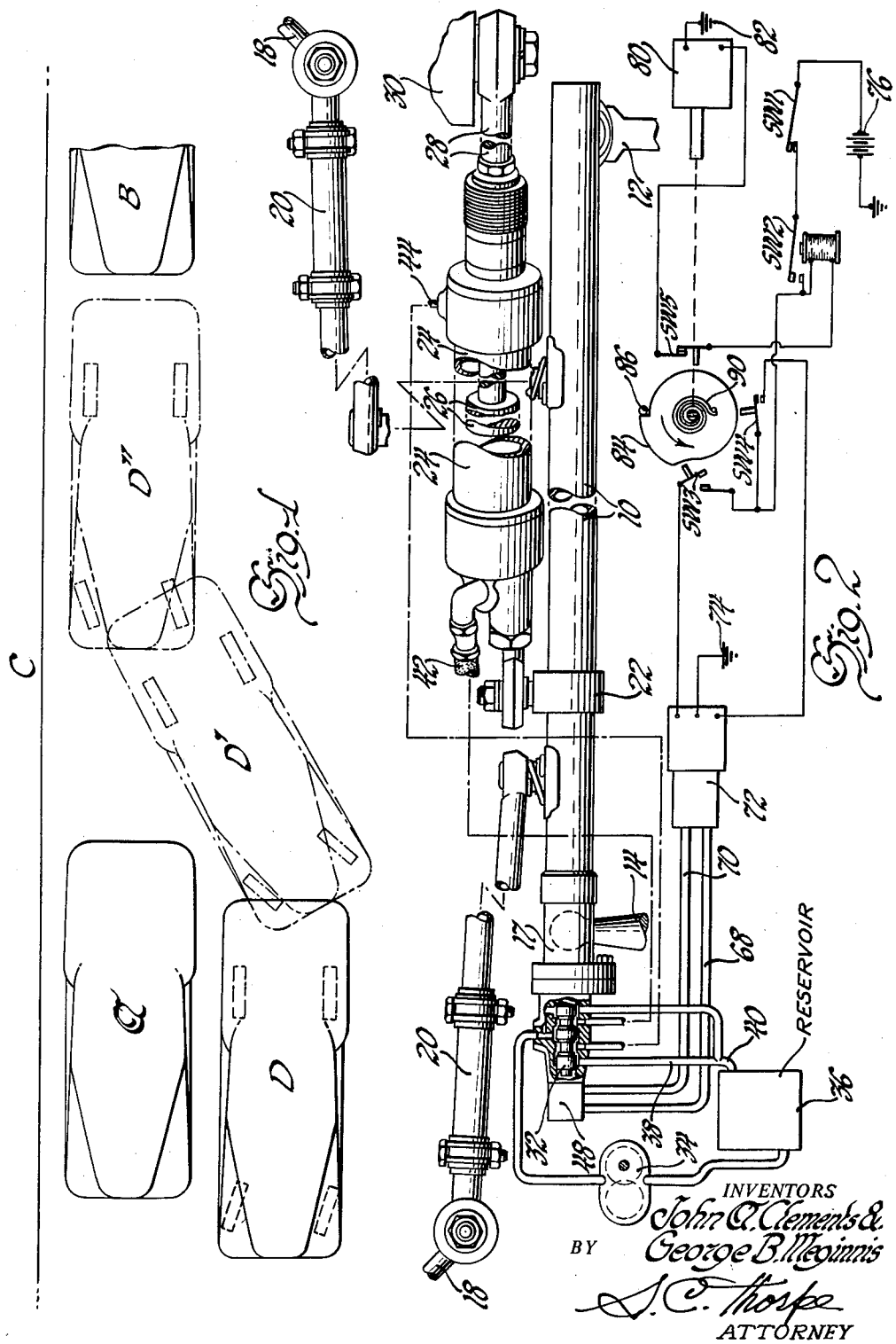
INVENTORS
John A. Clements &
George B. McGinnis
BY
J. C. Thorpe
ATTORNEY April 17, 1962  J. A. CLEMENTS ET AL  3,029,884
AUTOMATIC PARALLEL PARKING DEVICE
Filed Feb. 27, 1956  4 Sheets-Sheet 2

INVENTORS
John A. Clements &
George B. Meginnis
BY
J. C. Thorpe
ATTORNEY

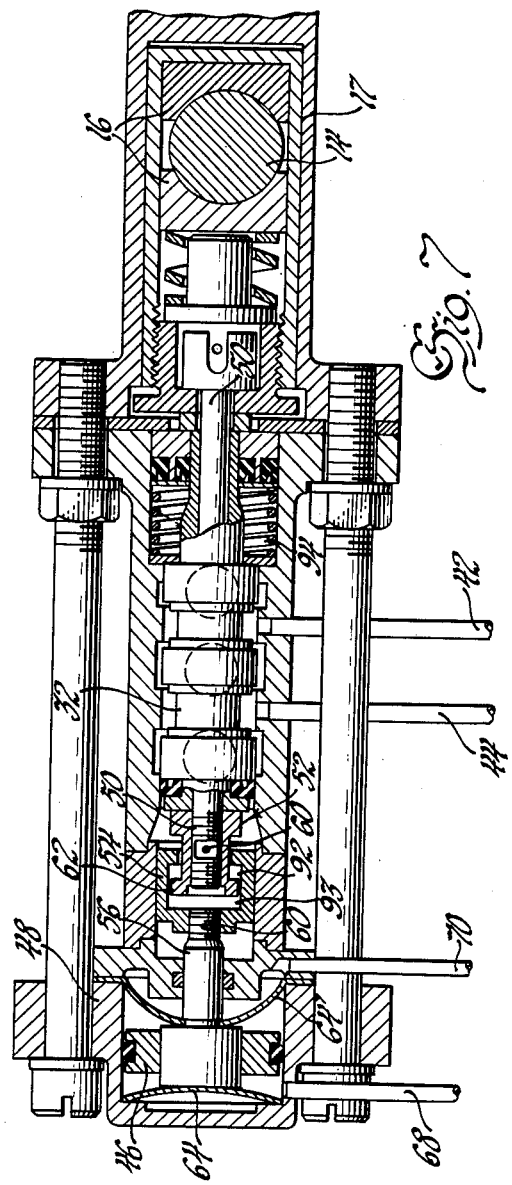

United States Patent Office 3,029,884
Patented Apr. 17, 1962

3,029,884
AUTOMATIC PARALLEL PARKING DEVICE
John A. Clements, Brownsburg, and George B. Meginnis, Indianapolis, Ind., assignors to General Motors Corporation, Detroit, Mich., a corporation of Delaware
Filed Feb. 27, 1956, Ser. No. 568,010
4 Claims. (Cl. 180—1)

This invention relates to a system of apparatus applicable to power steered vehicles, which apparatus serves to accomplish automatically a "pre-set" maneuver, by which is meant a maneuver that must conform to a certain pattern determined by fixed conditions, e.g. a curve or curves in a driveway traversed daily incident to backing a vehicle from a garage into a street, or a parking maneuver, as where it is desired to position the vehicle parallel to a curb between two previously parked cars, etc.

The invention is considered particularly valuable as applied in connection with the last-mentioned operation, which even with the advent of power steering is accomplished by many individuals only with annoying difficulty, and with the expenditure of considerable time in many cases. The annoyance is not limited to the driver since the operation often delays traffic on busy city streets, and if prolonged increases the likelihood of mishaps of varying seriousness.

According to the invention, the parking of the vehicle or other maneuver is achieved with substantially no effort on the part of the driver and in a minimum of time.

Generally described, the apparatus herein comprises a mechanism, as a cam or equivalent instrumentality, which is operated in accordance with the amount of rotation of the road wheels and which controls means governing the operation of the power steering equipment as required to achieve the maneuver. In effect, the apparatus takes over the steering function from the driver during the maneuver, although the driver may at any time overpower the apparatus if he desires. With the vehicle initially properly placed for the maneuver, the driver during the maneuver need operate only the accelerator and brake pedal; in fact, if the car is equipped with an automatic transmission set to allow some "creep," the driven may need only to manipulate the brake.

A preferred embodiment of the invention is illustrated by the accompanying drawings which will be referred to in the further description of the invention. In the drawings, FIGURE 1 shows the parking operation with reference to which the particular system was designed;

FIGURE 2 shows the apparatus schematically as applied to a hydraulic power steering gear;

FIGURE 7 is a section through the power steering control valve as modified for the purposes of the invention.

Figure 3:
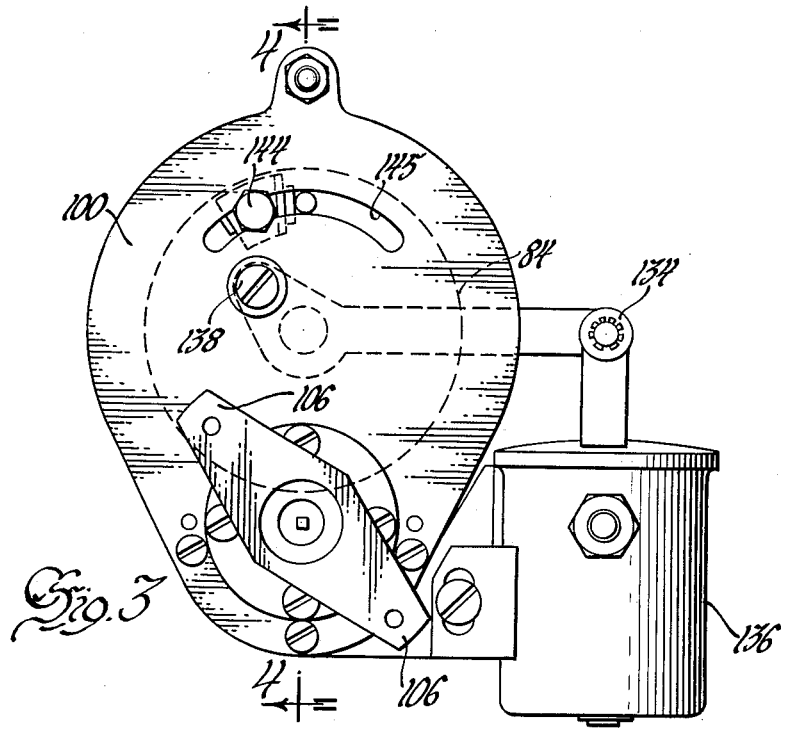
FIGURES 3-6 are details of the control component.
Figure 4:
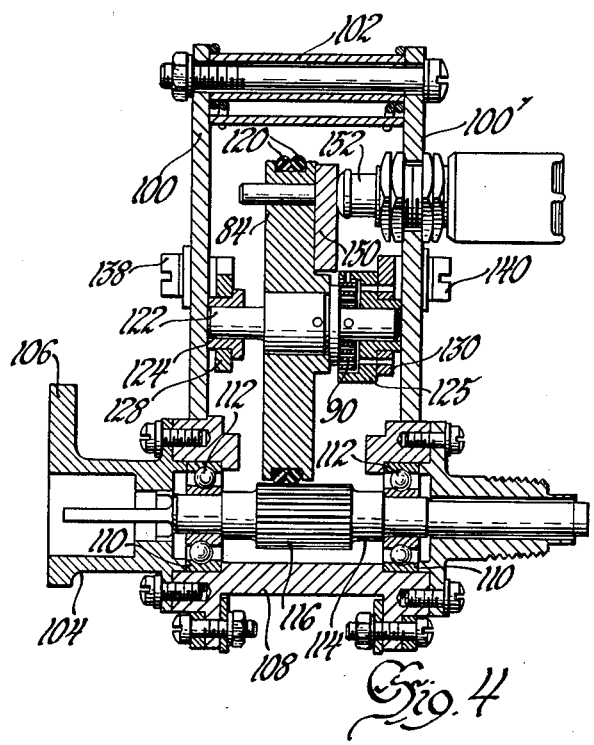

In FIGURE 1, A and B respectively indicate two cars parked by curb C, while D, D' and D'' denote a car being parked in accordance with the invention. The car is placed in position D by the driver, the car in such position being approximately 2½ feet from the side of car A and about 1 foot ahead of the rear bumper of such car. The operator then shifts the lever to reverse the transmission gearing and turns a knob or presses a button to bring about energization of the circuit hereinafter described. Upon release of the brake pedal, if depressed, the car thereafter proceeds through the parking cycle illustrated, the control switch being automatically opened on completion of the cycle. The driver's hands remain off the steering wheel during the parking, but as previously indicated, some acceleration may be necessary (1-2 m.p.h.) and braking is obviously essential at position D''.

In FIGURE 2 the apparatus herein is shown as applied to a so-called linkage type hydraulic steering booster. However, the invention is also applicable to integral power steering gears as shown, for example, in Davis Patent 2,213,271. Hydraulic linkage boosters are distinguished in that the fluid motor or jack and the control valve therefor are located under the body of the vehicle where the motor or cylinder is operably connected to a steering linkage member. In the case of integral type power steering gears, on the other hand, the fluid motor is normally operably connected to a steering member rearward of the steering linkage in the steering train, as the pitman arm, for example, while the control valve is located on or in proximity to the steering shaft and is directly actuated thereby.

The numeral 10 in FIG. 2 denotes a drag link or cross tie rod supported at one end by an idler arm 12 hingedly connected to the vehicle frame and at its other end by pitman arm 14, the ball stud end of which is received between the seats 16 of an adaptor 17 (see FIGURE 7).

The drag link 10 is connected to the steering knuckle arms 18, corresponding to the two dirigible wheels of the vehicle, via tie rods 20. A collar 22 fast on the drag link 10 provides a means of attachment for the power cylinder or jack 24. Within such cylinder is a piston 26, the shaft 28 of which is anchored at 30 to the vehicle frame.

At the left-hand end of the drag link is an assembly including a spool valve 32 in circuit with the cylinder 24 and a pump 34, drawing from a reservoir 36.

In the operation of the system so far described, the spool 32 is displaced in one direction or the other as governed by the direction of rotation of the steering wheel, not shown, to energize or pressurize the corresponding end of the power cylinder. Thus, on a right turn the spool is displaced to the left so that pressure fluid is admitted to the left-hand chamber of the power cylinder. The resulting leftward movement of the cylinder carries the drag link 10 in that direction, swinging the steering knuckle arms 18 to the right. During this movement fluid exhausts from the righthand chamber of the power cylinder through the control valve to the reservoir 36 via line 38, 40. With cessation of the manual effort at the steering wheel, the housing about the spool 32 catches up with the latter cutting out the power assist and allowing the dirigible wheels to reverse in the usual manner.

It should be noted that the control valve, including spool 32, is of the open-center type, i.e. with the spool in neutral position and with the pump 34 in operation, fluid constantly circulates from the pump through the valve and thence back to the pump via the reservoir against the static pressure of the fluid confined in the power cylinder. Numerals 42 and 44 indicate the hose sections connecting the valve and power cylinder.

According to the illustrated embodiment of the invention, the assembly at the left end of the drag link (FIG. 7) comprises a piston 46 housed within a cylinder 48 and linked to the stem 50 of the spool 32 via connectors 52 and 54, the latter connector being threadingly fixed to the shaft 56 of the piston 46, the former being similarly fixed to the stem. Lock pins 60 secure the threaded connections. As will subsequently be better understood, piston 46 and the housing 48 constitute a fluid motor functional with respect to the spool 32.

Connector 54 will be seen as providing a chamber housing the flange portion 62 of the connector 52 and is axially movable relative to such flange portion.

At the sides of the piston 46 are spider type bellville springs 64, 64'. These springs tend to maintain the piston and connector 54 in their neutral positions shown. They are not essential to the system, representing merely a refinement.

Hose connections 68 and 70 extending from the cylinder 48 terminate at a reversible hydro-electric pump 72 grounded at 74 to the vehicle frame and powered from the battery 76 of the vehicle. In the electrical circuit are five switches $Sw_1$–$Sw_5$ and a solenoid 80 grounded at 82 and adapted to operate a clutch, not shown, functional with relation to a cam 84 controlling switches $Sw_3$, $Sw_4$, and $Sw_5$. With the circuit open as shown, the cam is held against a stop 86 by force of a re-wind spring 90.

$Sw_1$ is a back-up light switch and closes automatically on shifting of the lever putting the reverse gearing of the transmission into play. $Sw_2$ is the manual control switch for the automatic parking device and once closed remains closed until it is automatically opened at the end of the parking cycle when the coil about the magnet becomes de-energized with the opening of $Sw_5$ by the cam 84. The closing of $Sw_2$ energizes the solenoid 80 causing clutching of the cam 84 to its drive, preferably powered by the flexible speedometer drive shaft, if the vehicle is so equipped.

Cam 84 as represented in FIG. 2 is shaped to accomplish the automatic parallel parking when it is desired to park on the right side of the street, as is usually the case.

The operation of the system as represented is as follows:

$Sw_1$ and $Sw_2$ are closed as previously indicated to energize the solenoid 80 thereby to clutch the cam to its drive. As the cam rotates counterclockwise it closes $Sw_3$ energizing the electro-hydraulic pump 72 so that the pump discharges through conduit 70. Piston 46 in cylinder 48 is thus forced leftwardly to carry the connector 54 in that direction. Once the lost motion represented by the chamber 92 is taken up, spool 32 is displaced to the left against the resistance of its centering spring 94, causing pressurization of the left-hand chamber of the power cylinder 24. As a consequence, the dirigible wheels are swung rightward (position D, FIGURE 1) and remain in this position until the cam 84 closes $Sw_4$ after permitting $Sw_3$ to open. On the closing of $Sw_4$, electrohydraulic pump 72 reverses, making line 68 the pressure line and line 70 the exhaust line. During this reversal, spring 64 re-centers piston 46 in the cylinder 48.

Upon the admission of pressure fluid into the cylinder 48 from the line 68, piston 46 moves rightwardly to force the connector 54 in that direction. With the lost motion represented by the chamber 93 taken up, spool 32 on the further movement of the connector is displaced to the right bringing about pressurization of the right-hand chamber of the power cylinder 24, causing the cylinder to move rightward thereby to swing the dirigible wheels of the vehicle to the left where they remain through completion of the cycle.

The final action of cam 84, after $Sw_4$ is permitted to open, is to open $Sw_5$ to de-energize the solenoid 80 and the holding coil controlling $Sw_2$. With the solenoid de-energized, return spring 90 rotates the cam to its position against the stop 86.

It should be pointed out that the lost motion 92, 93 serves to permit normal operation of the spool 32 when the vehicle is not being parked. The lost motion in either direction exceeds the maximum spool movement in that direction.

The pressures required to displace the spool 32 through the piston 46 are not excessive, hence the driver of the vehicle can easily overpower the automatic parking apparatus should it become necessary or desirable so to do.

Referring now to FIGURES 3–6 showing a cam control assembly which has been found suitable as a commercial installation, it will be seen that the assembly comprises housing plates 100, 100' separated by spacers 102. Plate 100 has fixed thereto a boss member 104 having flanges 106 adapted for connection to a suitable mount. A third housing member 108 is disposed between the plates 100, 100' and seats races 110 for the ball bearings 112. Turning within the bearing is a shaft 114 adapted to be driven by the flexible speedometer drive, previously mentioned, and having a serrated portion 116 engaging rubber rings 120 carried by the cam 84. The shaft 122 of the cam is journalled in bushings 124, 125, bushing 125 being made to larger diameter than bushing 124 so as to accommodate the return spring 90 which, of course, is connected both to the cam shaft and bushing.

Bushings 124 and 125 are carried by the arms 128 and 130 of a yoke member 132 (FIG. 6) connected at 134 with the armature of solenoid 136. The ends of the arms are pivotally supported at 138 and 140 to plates 100 and 100' respectively so that on de-energization of the solenoid 136 the cam is lifted off its drive 116 as a consequence of the resulting outward movement of the solenoid armature, which is loaded by a spring, not shown. The stop assembly for the cam is indicated at 144, and it will be noted that the same is adjustable in the slot 145.

Figure 5:
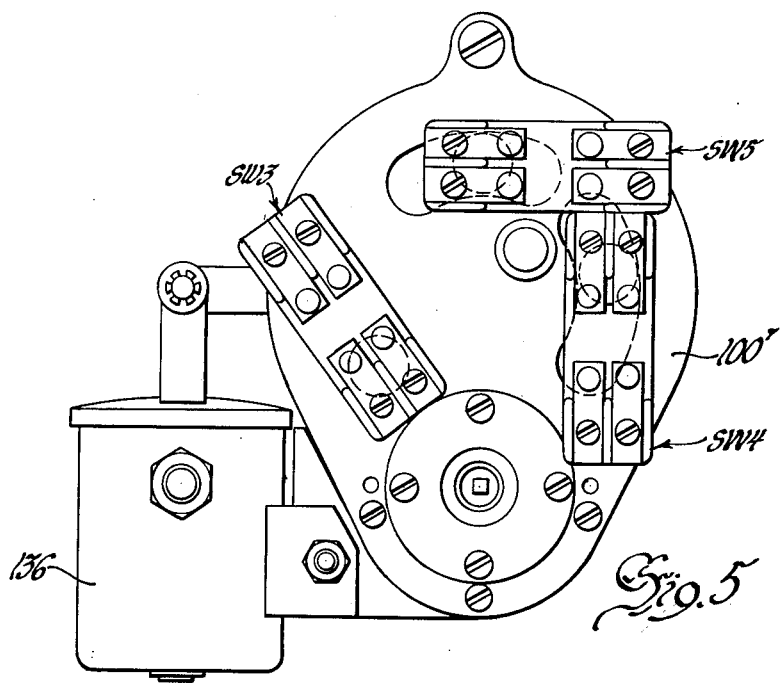
Figure 6:
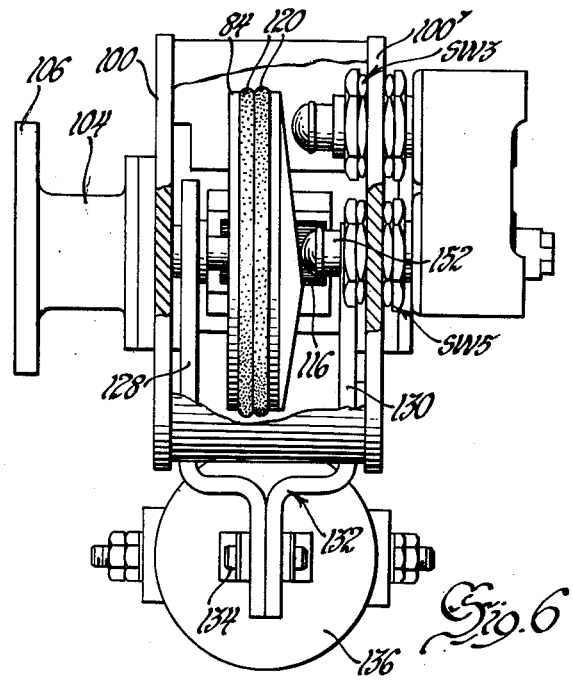

To accomplish the previously described switching, the right-hand face of the cam (FIG. 4) is contoured by the addition of sectors 150 engaged by the plungers 152 of the switches, the placement of which will be seen from FIGURE 5. These switches, like the stop assembly, are adjustable in arcuate slots.

We claim:

1. In an automotive vehicle having road wheels and equipped with steering apparatus including power means operatively connected to a steering member and means governing said power means, said governing means being normally manually controlled, the combination of means auxiliary to said steering apparatus whereby said governing means may be automatically manipulated to energize said power means as required for the execution of a predetermined maneuver without manual steering control, said auxiliary means comprising control means operated in accordance with the amount of rotation of said wheels, a reversible pump carried by the vehicle and electrically connected to said control means for control thereby, a fluid motor associated with said governing means and including a member displaceable by fluid pressure and a housing therefor, said displaceable member having a lost motion connection with said governing means permitting normal operation of the latter without interference from said displaceable member, and a pair of conduits extending between said pump and said motor and opening to said housing at opposite sides of said displaceable member.

2. In an automotive vehicle having road wheels and equipped with steering apparatus including an hydraulic jack operatively connected to a steering member and a valve governing said jack, said valve being normally manually controlled and taking the form of an axially movable spool element, the combination of means auxiliary to said steering apparatus whereby said valve may be automatically manipulated to energize said jack as required for the execution of a predetermined maneuver without manual steering control, said auxiliary means comprising control means operated in accordance with the amount of rotation of said wheels, a reversible pump carried by the vehicle and electrically connected to said control means for control thereby, a fluid motor including a piston displaceable by fluid pressure and a housing therefor, said piston having a lost motion connection with said valve permitting normal operation of the latter without interference from said piston, and a pair of conduits extending between said pump and said motor and opening to said housing at opposite sides of said piston.

3. Apparatus according to claim 2 where said piston has spring means associated therewith, said spring means tending to maintain said piston in a centered position in said housing.

4. Apparatus according to claim 2 where said pump is powered by an electric motor and where said control means takes the form of a cam rotated in accordance with the amount of rotation of said road wheels, said cam controlling a pair of switches in circuit with said electric motor.

References Cited in the file of this patent

UNITED STATES PATENTS

| | | |
|---|---|---|
| 1,364,872 | Feightner | Jan. 11, 1921 |
| 2,424,288 | Severy | July 22, 1947 |
| 2,621,266 | Gretener | Dec. 9, 1952 |
| 2,661,402 | Balch | Dec. 1, 1953 |
| 2,736,015 | Gilvarry et al. | Feb. 21, 1956 |
| 2,775,132 | Orr et al. | Dec. 25, 1956 |
| 2,797,764 | Wsong et al. | July 2, 1957 |